United States Patent [19]

Faivre et al.

[11] Patent Number: 5,271,830
[45] Date of Patent: Dec. 21, 1993

[54] WATER TREATMENT INSTALLATION FOR A TANGENTIAL FILTRATION LOOP

[75] Inventors: Michel Faivre, Acheres; Annie Tazy-Pain, Asnieres, both of France

[73] Assignee: Gie Anjou-Recherche, Maisons Laffitte, France

[21] Appl. No.: 624,726

[22] Filed: Dec. 10, 1990

[30] Foreign Application Priority Data

Dec. 11, 1989 [FR] France .................. 89 16527

[51] Int. Cl.⁵ .................. C02F 1/78; B01D 61/00
[52] U.S. Cl. .................. 210/151; 210/195.1; 210/202; 210/258; 210/321.69; 210/512.1
[58] Field of Search .......... 210/760, 788, 151, 195.1, 210/196, 202, 203, 258, 298, 321.69, 407, 409, 410, 416.1, 512.1

[56] References Cited

U.S. PATENT DOCUMENTS

| | | | |
|---|---|---|---|
| 3,992,301 | 11/1976 | Shippey et al. | 210/140 |
| 4,021,347 | 5/1977 | Teller et al. | 210/203 |
| 4,569,759 | 2/1986 | Ben Aim et al. | 210/512.1 |
| 4,734,207 | 3/1988 | Calloni et al. | 210/788 |
| 4,894,149 | 1/1990 | Block | 210/258 |
| 5,114,576 | 5/1992 | Ditzler et al. | 210/203 |

FOREIGN PATENT DOCUMENTS

0165744 12/1985 European Pat. Off. .
2389400 1/1978 France .

OTHER PUBLICATIONS

Chemical Abstracts, vol. 109, No. 2, Jul. 11, 1988, p. 318, resume No. 14477f Columbus, Ohio, US; W. B. Bedwell et al: "Crossflow microfiltration-fouling mechanisms studies", and Sep. Sci. Technol. 1988, 23(6-7).
Chemical Abstracts, vol. 111, No. 16, Oct. 16, 1989, p. 378, resume No. 140167v, Columbus, Ohio, US; and JP-A-01 04 289 (Japan Organo Co., Ltd) Sep. 1, 1989.

Primary Examiner—Thomas Wyse
Attorney, Agent, or Firm—Merchant, Gould, Smith, Edell, Welter & Schmidt

[57] ABSTRACT

An installation for the filtration and cleansing of liquids, notably water, of the type having a loop for the circulation of the water to be treated, including at least one tangential filtration membrane, comprising a new tangential membrane filtration installation, with ozone injection, enabling the surface, internal and chemical clogging of the membrane to be restricted. The installation includes means for the addition of an oxidizing gas to the liquid to be treated, in the loop upstream of the membrane, so as to form microbubbles of said gas with a size such that they create turbulence in the liquid at the membrane and this turbulence, combined with the phenomenon of oxidation, restricts the clogging of said membrane and leads to an improvement in the flow rate and in the physical/chemical qualities of the filtrate. If necessary, it includes means for the injecting of chemical reagents and/or absorbents into the filtration loop.

19 Claims, 3 Drawing Sheets

WATER TREATMENT INSTALLATION FOR A TANGENTIAL FILTRATION LOOP

BACKGROUND OF THE INVENTION

1. Field of the Invention

The field of the invention is that of installations for the cleansing and filtering of liquids, notably water, of the type including a loop for the circulation of the water to be treated, including at least one tangential filtration membrane.

The installation of the invention can be applied preferably to the cleansing of surface water but those skilled in the art could contemplate using it for the treatment of waste or untreated water at other steps of the cleansing chain or, again, for the treatment of other liquids.

2. Description of the Prior Art

Water treatment with a view to the distribution of water for consumption, taking account of currently prevailing standards, has the following main aims:
- the removal of the suspended matter;
- the removal of organic matter;
- the removal of harmful ions;
- sterilization.

The standard treatment chain mostly includes a succession of physical/chemical steps of the coagulation-flocculation-decantation-filtration type.

The filtration step, for which the present invention proposes a new implementing installation, makes it possible to refine the treatment and to retain most of the residual reagents.

In a known way, the term tangential filtration shall be applied to any filtration where the fluid to be filtered circulates under pressure in parallel to the filtering surface as opposed to front filtration where the fluid flows perpendicularly to this very same surface.

Tangential filtration with mineral membranes has many advantages over standard type filtration. In particular:
- the quality of chemical, thermal and bacteriological inertia of the mineral membranes;
- the limiting of excessively fast clogging through the self-cleaning of the filtering surface by the fact that the non-filtered particles are entrained or carried along owing to the tangential circulation speed of the untreated water.

Tangential ultrafiltration and microfiltration on mineral membranes are considered to be excellent methods of treating water and making it potable for small installations. These methods are generally implemented in a circulation loop of the liquid to be treated, a part of the liquid (the permeate) going through the membrane when the filtrate remains in the loop.

Ultrafiltration is a method of separation, under pressure, of the dissolved or suspended macromolecules, bacteria (with a diameter of 0.5 to 10 microns), viruses (minimum diameter: 20 nanometers) and other microorganisms, by an aysmmetrical membrane in which the size of the pores varies between 1 nanometer and 0.1 microns.

For microfiltration, the diameter of the pores varies between 0.1 and 10 microns.

One of the crucial problems encountered in tangential membranes is clogging, which may take many forms:

surface clogging: when the filtration takes place, there is always an immobile boundary layer of solution, in contact with the membrane, from which water is continually extracted and in which the solute retained collects to abnormally high levels of concentration. This phenomenon is called polarization of concentration and leads to the formation of a so-called polarization layer. The speed of circulation of the fluid that flows tangentially to the membrane should be high enough to prompt a self-cleaning of the membrane and restrict the formation of the polarization layer and, hence, the gradual clogging of the membrane by precipitation of the products on the surface of this membrane;

internal clogging: among the particles capable of going through a microfiltration membrane there are, in particular, colloids with a size that is very slightly smaller than that of the pores of the membrane into which they penetrate and flocculate, in prompting an irreversible clogging:

chemical clogging: caused essentially by hydrophobic substances such as proteins and oily particles.

Following the filtering operation, it is known that the water should then be rid of pathogenic microorganisms by means of oxidizing agents (ozone, chlorine etc.) or UV rays or again refining treatment with granular or powdered active carbon (for the removal of micropolluting agents, heavy metals as trace elements, and unwholesome odors and flavors).

The use of ozone is recognized as being efficient not only for bactericidal and virus-killing applications, but also in combined steps of ozonization/coagulation, ozonization/floatation (ozoflottation) and ozonization/adsorption on filtering media, not to mention other more standard applications such as iron extraction and demanganization or the removal of flavors and odors. Finally, it is known that ozone has an oxidizing effect on a number of micropolluting agents (such as phenols, certain detergents, etc.) (see B. Langlais, "Nouveau développement de l'ozonation en eau potable et technologie approprié" (New Development of Ozonization in Potable Water and Appropriate Technology) in L'Eau, l'industrie, les nuisances, No. 109, April 1987, pp. 28 to 30).

However, ozonization has two major limitations:

when an oxidizing agent is used, chlorine is generally chosen to play a role of disinfection (instead of ozone, by UV radiation etc.) because of its remanent effect which circumvents possible recontamination during the storage of the treated water or during its transfer into the distribution conduits;

furthermore, the use of a gas is highly unadvisable in tangential membrane filtration loops. Indeed, the gas is injected in the form of bubbles so as to achieve a maximum gas/liquid transfer. Now, it is known that a clogging of the membranes may occur by the expansion of the bubbles in the membrane. As described by F. Duclert and M. Rumeau in "Microfiltration d'eau sur membranes minérales. Influence des sels et des gaz" (Microfiltration of Water in Mineral Membranes. Influence of Salts and Gases), Liquides Magazine, No. 9, January--February 1989 concerning air dissolved in water, in passing through the membrane, the pressurized solution is released by atmospheric pressure and the dissolved air "precipitates" by a phenomenon of effervescence, giving rise to microbubbles of air within the pores. By coalescence, these bubbles may then prompt an occlusion of the pores of the membrane.

SUMMARY OF THE INVENTION

It is an aim of the invention to provide a novel tangential membrane filtration installation with ozone injection, despite the drawbacks and restrictions known in the state of the art.

It is another aim of the invention to provide a liquid cleansing installation such as this, making it possible to limit the surface, internal and chemical clogging of the membrane.

It is a complementary aim of the invention to provide an installation including several configurations of implementation, notably for the injection of ozone, as a function of the nature of the liquid to be treated.

These aims, as well as others that will appear here below, are achieved by means of an installation for the filtering and cleansing of liquids such as water, of the type including a filtration loop with recirculating pump and at least one tangential filtration membrane through which a part of the liquid to be treated flows, the installation including means for the addition of an oxidizing gas to the liquid to be treated, in the loop upstream of the membrane, so as form microbubbles of said gas with a size such that they create turbulence in the liquid at the membrane and this tubulence, combined with the phenomenon of oxidation, restricts the clogging of said membrane and leads to an improvement in the flow rate and in the physical/chemical qualities of the filtrate.

According to the invention, it is seen that, unlike what is taught in the state of the art, the successions of microbubbles have an unclogging effect owing to the reduction of the boundary layer by the turbulence created by the shifting of the bubbles. This positive effect, combined with the chemical effect of oxidation of the gas (particularly when the oxidizing gas is ozone) is unexpectedly preponderant over the risk of clogging by the expansion of the gas in the membrane.

Preferably, the size of the microbubbles is 10 $\mu$m to 2 mm in diameter, and the proportion and concentration of the gas added to the liquid to be treated are variable as a function of the quality of the liquid to be treated, and said oxidizing gas is ozonized air.

Advantageously, said liquid to be treated receives a prior chemical conditioning upstream of said filtration loop.

Preferably, said filtration loop includes a degassing tube adapted to the protection of the recirculating pump against said microbubbles.

In one particular embodiment, notably for the treatment of water charged with organic matter, said filtration loop includes means for injecting determined doses of chemical reagents and/or adsorbents, downstream of said means for the injection of oxidizing gas such as ozonized air.

Advantageously, said adsorbent is active carbon.

The invention therefore enables the simultaneous implemenatation of a ozonization process and a chemical treatment with active carbon, with the use of a tangential filtration membrane, thus forming a positive synergy contributing to especially high efficiency of the filtration process.

In another particular embodiment, said circulation loop includes means for injecting an oxidizing gas into said filtration loop.

Said means for injecting an oxidizing gas belong to the group including emulsifying machines mounted upstream of the degassing tube, porous materials placed in the degassing tube, the ozonization-floatation devices and the ozonization vessels.

In the case of an ozonization-floatation device, said ozonization-floatation is carried out by porous materials, the sweeping of which achieved by the recirculation conduit.

According to another embodiment, the ozone is introduced by means of an emulsifying machine.

In certain types of treatment, notably in the case of water highly charged with ammonia, said degassing tube is advantageously formed by an aerated biological filter. Preferably, said biological filter includes floating biomass supports, upstream of which there are positioned the injection means of said liquid to be treated.

BRIEF DESCRIPTION OF THE DRAWINGS

Other characteristics and advantages of the invention will appear from the following description of certain preferred embodiments of the invention, given by way of a non-restrictive example, and from the appended drawings, of which.

DESCRIPTION OF PREFERRED EMBODIMENTS

Figure 1:
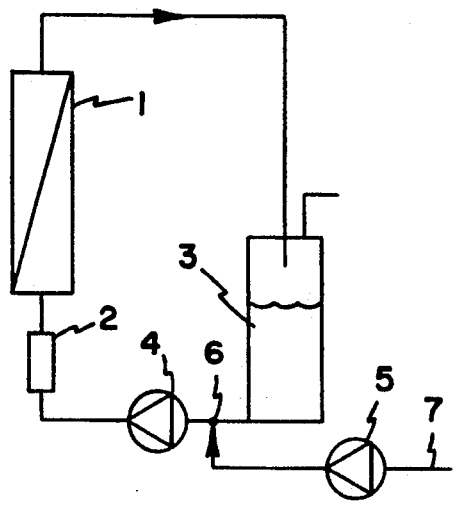
FIG. 1 represents a first simplified embodiment of a filtration loop according to the invention with means for the injection of ozone microbubbles upstream of a tangential filtration membrane.

As shown in FIG. 1, a filtration loop of an installation according to the invention, in its simplified form, includes a tangential membrane 1, a device 2 for the injection of ozone microbubbles, a degassing tube 3 and a recirculating pump 4. The liquid to be treated is brought into the loop by a conduit 7 including a feed pump 5. The introduction of the liquid to be treated into the loop is carried out at a point 6 located between the degassing tube 3 and the recirculating pump 4.

As already mentioned, the introduction of the ozone in the form of microbubbles advantageously makes it possible to create increased turbulence reducing the boundary layers of the liquid circulating tangentially to the filtration membrane 1. This turbulence contributes to restricting the clogging of the membrane, by combined action related to the entraining of the filtration particles and to the increase in the transfer of the ozone and in the oxidation reactions. In other words, it is possible to identify the following combined positive effects:

reduction in the clogging capacity of the water, by reduction of the viscosity, and therefore reduction of the thickness of the boundary layers in accordance with the laws of fluid dynamics, whence an increase in the flow rate of the permeate, permitting a reduction in the investment on membrane surface;

attacking and reduction of the organic matter contained in the water to be treated;

disinfectant effect, notably antibacterial effect, of the ozone;

reduction of the flavors in the water;

increase in the lifetime of the membrane, owing to the reduction of the clogging agents.

The oxidizing gas used is advantageously ozone, owing to its oxidizing and disinfecting capacity. This gas is preferred to chlorine which forms sapid sub-products and has certain effects detrimental to health. However, the present invention is not restricted to the use of ozone.

The determining of the quantity of ozone injected in the form of microbubbles is done with a proportion and concentration that are variable according to the quality of the water to be treated and the desired level of quality for the treated water. This determining is done notably in order to obtain a given level of oxidizing gas dissolved in the liquid to be treated.

For example, it is advantageous to obtain a proportion of dissolved oxidizing gas of the order of 0 to 2 mg/l, as measured in the permeate at output of the membrane.

As shall be seen further below, the choice of the ozone can be explained also by the fact that second ozone injection means can be provided for in the filtration loop, notably with the aim of further carrying out a process of ozonization-floatation under pressure.

The tangential filtration membrane 1 used is advantageously a mineral membrane, of the asymmetrical type or, again, of the composite type.

In a known way, asymmetrical membranes are generally made of polysulfone polymer, and have pores in the shape of overturned funnels. These characteristics enable a reduction in the loss of load through the membrane, as compared with symmetrical membranes.

Composite membranes, for their part, are formed by an overlapping of homogeneous microporous layers with a size grading that gets smaller as and when the filtering surface is approached. The diameter of the pores is therefore determined by the first layer, which is in direct contact with the fluid to be filtered. Thus, in this type of membrane too, there is an observed overturned funnel through the fact that the permeate encounters increasing "space" as it crosses the membrane.

In the present state of membranes on the market, the use of organic membranes is unadvisable in the presence of ozone. However, we cannot rule out the fact that the invention may also apply to the case of organic membranes with tangential filtration, whether these membranes have been made neutral with respect to the oxidizing gas injected in the form of microbubbles or whether specific oxidizing gases or mixtures of oxidizing gases have been selected for their neutrality with respect to the materials of these membranes.

The ozone injection means 2 are, for example, formed by an emulsifying machine (also called a liquid jet vacuum pump or hydroinjector). It is also possible to use Venturi type emulsion instruments or any other type of apparatus enabling oxidizing gas microbubbles in the liquid to be treated.

The feeder conduit 7 for liquid to be treated advantageously includes means for the prior chemical conditioning of the liquid.

It will be seen that all the effects of treatment of the water and of injection of bubbles reduces the speed with which the membrane 1 is clogged. The installation according to the invention therefore considerably increases the duration of the filtration cycles of the membrane especially if, as the case may be, we add to it the use of the usual processes of unclogging by flow reversal, in thus delaying the periodicity of the chemical unclogging.

In one particularly advantageous embodiment, the unclogging of the membrane is ensured by making the circulation loop work in closed circuit, with clear water, and by continuing the injection of the ozone microbubbles. This operation makes it possible to renew the membrane, without modifying the installation or making it complicated. In particular, it complements or even replaces the usual methods of injecting soda and acid which require specific devices.

Advantageously, during these periodic operations of renewal, it is possible to seek to obtain levels of residual ozone dissolved in the permeate, at output of the membrane, of the same order as during the water treatment cycles (0 to 2 mg/l).

The operation of renewal by injection of ozone microbubbles may or may not be done in combination with flow reversal processes.

Figure 2:
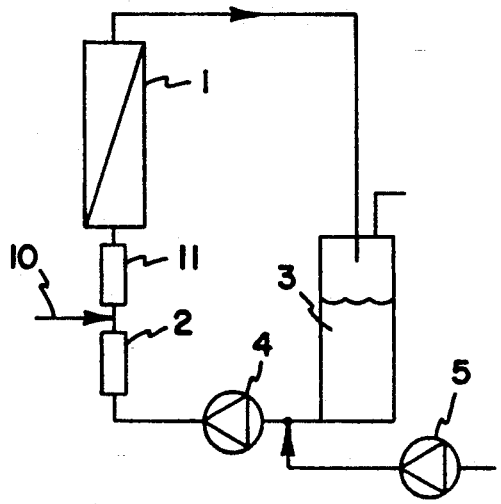
FIG. 2 represents a second embodiment of a filtration loop, including means for the injection of chemical reagents and/or adsorbent and a static mixer between the ozone injection means and the tangential filtration membrane.

In the embodiment of FIG. 2, the means 10 for the injection of chemical reagents and/or adsorbents are located downstream of the means 2 for injecting ozone microbubbles. These injection means 10 are furthermore located upstream of a static mixer 11, which promotes the homogenization and action of the injected reagents. As a non-restrictive example, it is possible to use an on-line static mixer. The addition of the reagents makes it possible to increase the flow rate of filtration. The injected proportions are determined as a function of the COD (chemical oxygen demand) or the TOC (measurement of the total organic carbon) representing the proportion of organic matter in the water that is to be treated and is treated.

The flocculent chemical reagents are, for example, alumina sulphate, aluminium polychloride or, again, ferrous chloride. These reagents, given on a non-exhaustive basis, have a flocculation effect which precipitates the particles contained in water, in order to enable their agglomeration.

In the case of the injection of an adsorbent, it is advantageous to inject active carbon. The active carbon, injected in the form of powder, has a positive chemical effect for the filtration process. It is also possible to replace active carbon by lignite, active alumina or, again, a zeolite, in macroporous or microporous form. However, these substitutes are generally less efficient than active carbon.

The installation of the invention provides for a particularly valuable synergy in the combination of tangential filtration membrane, ozone microbubbles and active carbon.

Figure 3:
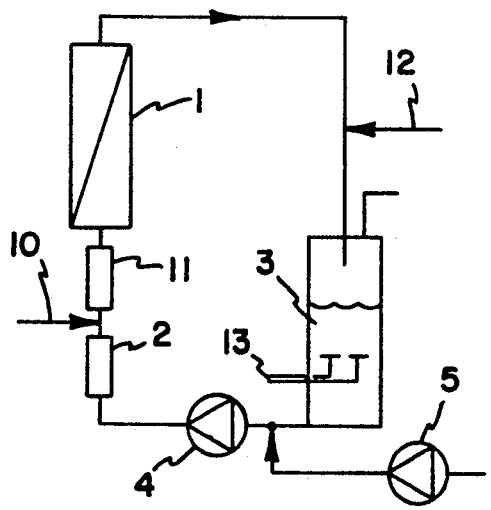
FIG. 3 gives an illustration, within one and the same drawing, of two embodiments of second means for injecting ozone into the loop, by emulsifying machine or by porous materials placed in the degassing tube of the filtration loop respectively.

FIG. 3 illustrates three possible modes of injection of ozone into a second injection point in the filtration loop. It is particularly advantageous to provide for a second ozone injection point in the case of the treatment of water charged with organic matter, or requiring iron extraction or demanganization.

In a first embodiment, the injection is done at a point 12, for example by means of an emulsifying machine 10 upstream of the degassing tube 3.

Figure 4:
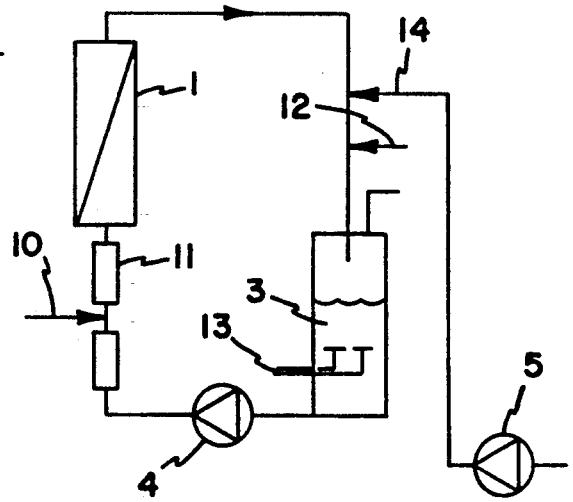
FIG. 4 shows a fifth embodiment of the loop according to the invention with chemical conditioning upstream of the circulation loop.

In the embodiment of FIG. 4, the injection of the water to be treated is done upstream of the circulation loop at a point 14. Thus, the liquid to be treated undergoes chemical conditioning before being reintroduced into a new filtration cycle.

Figure 5:
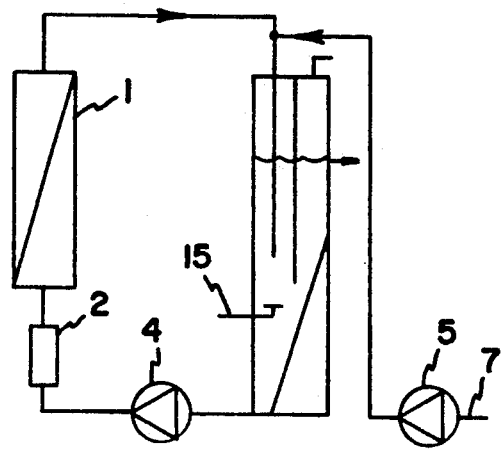
FIG. 5 shows a sixth embodiment of the loop including a second device for the injection of ozone by porous materials according to a process of ozonization-floatatation under pressure.
Figure 6:
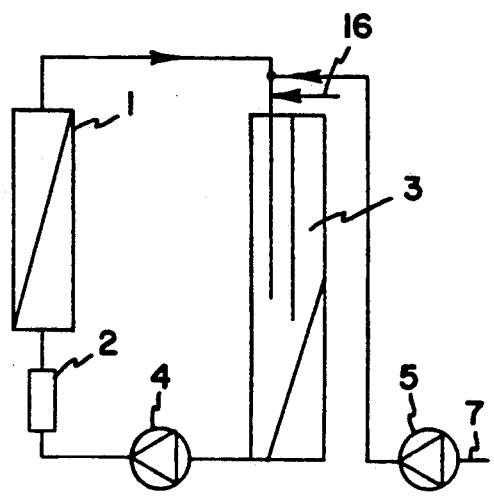
FIG. 6 shows a seventh embodiment of a filtration loop according to the invention, with a second device for the injection of ozone by means of an emulsifying machine implementing a process of ozonization-floatation under pressure.
Figure 7:
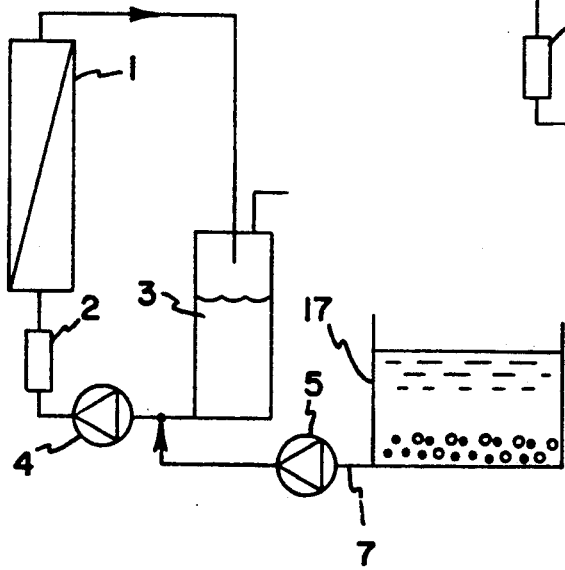
FIG. 7 shows an eighth embodiment of the loop including a second device for the injection of ozone by ozonizing tank implementing a process of ozonization-floatation under pressure.

FIGS. 5, 6 and 7 illustrate three embodiments corresponding to the implementation of an ozonization-floatation process, under pressure or not under pressure, for example of the type described in the French patent application No. 86 08780 dated Jun. 18, 1986.

In the case of the embodiment of FIG. 4, the ozonization is provided by pores 15, the sweeping of which is provided by the circulation in the loop.

In the case of FIG. 6, the introduction of ozone is done no longer by pores 15 but by an emulsifying machine 16 located upstream of the tube 3 for degassing and ozonization-floatation under pressure.

Finally, the ozonization-floatation process is implemented in FIG. 7, upstream of the filtration loop, inside an ozonization vessel 17.

Figure 8:
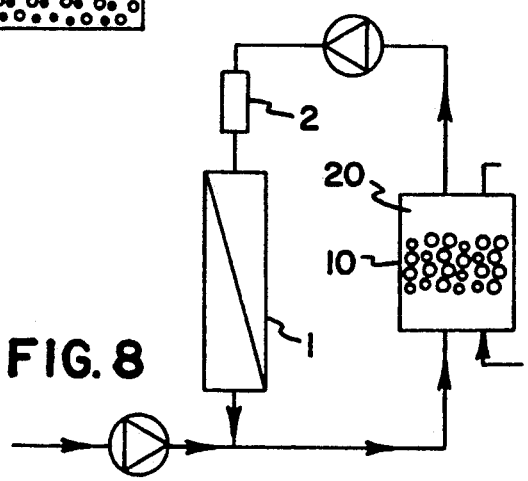
FIG. 8 shows a ninth embodiment of a filtration loop according to the invention including a biological filter.

FIG. 8 shows an embodiment of the filtration loop of the invention, within which an aerated, biological filter 20 has been placed. This filter 20 plays the role of the degassing tube and may be made by means of floating materials where the water to be treated, with the possible addition of reagents, is injected upstream of the supporting materials of the biomass.

Two comparative examples of microfiltration, with and without injection of ozonized air bubbles in a filtration loop, are presented here below.

EXAMPLE 1

A sample of drilling water containing, on an average, 0.3 mg.l of iron and turbidity of 2NTU was treated by two types of treatment:

1. Treatment by tangential ultrafiltration on membrane (porosity=500 angstroms). The speed of circulation is 4.3 M/S, the transmembrane pressure is 1 bar and a reverse flow unclogging is carried out for 5 s every 5 minutes.

2. Ozone treatment (proportion 1 g/m³) followed by ultrafiltration on membrane, the operational values used being identical to those of the first treatment, and the ozone being injected on line into the recirculation loop, upstream of the membrane, by emulsifying machine.

The flow rates obtained by these two treatments are given in Table I.

TABLE I

| Type of treatment | Flow of permeate at start of operation | Flow of permeate obtained at the end of 3 hours of operation |
| --- | --- | --- |
| 1 Microfiltration without ozone in the loop | 0.85 m³/h.m².bar | 0.700 m³/h.m².bar |
| 2 Microfiltration with ozone according to the method | 0.85 m³/h.m².bar | 0.900 m³/h.m².bar |

This example shows that the ozonized air bubbles do not disturb the ultrafiltration performance characteristics: the flow of permeate is even improved by about 30% by the ozone/tangential filtration coupling.

EXAMPLE 2

Seine water was treated by the following two types of treatment:

1. Flocculated Seine water was treated by tangential microfiltration on a membrane (porosity=0.2 μm). The speed of circulation was 4.4 m/sec, the transmembrane pressure was 1 bar; a reverse flow unclogging was carried out for 5s/5 min. A deconcentrating purge was fixed at 30 l/h.

2. Ozone treatment (proportion 1 g/m³) of previously flocculated Seine water followed by ultrafiltration on membrane; the operational values were identical to those of the first treatment. The ozone was injected into the recirculation loop on line, upstream of the membrane, by an emulsifying machine.

The results obtained by the two treatments are given in table II:

TABLE II

| | Organic materials | | | | Flow of Permeate | |
| --- | --- | --- | --- | --- | --- | --- |
| | UW mgO₂/l | FW mgO₂/l | Abt mgO₂/l | | m³/m².h.bar point 0 | m³/m².h.bar after 8 h. |
| Treatment 1 Flocculated Seine Water | 7.13 | 2 | 5.13 | 70% | 1 | 0.6 |
| Treatment 2 Ozonated flocculated Seine Water upstream of the membrane | 9.17 | 1.96 | 7.21 | 78% | 1 | 1 |

The table gives the proportion of organic matter (in mg of O₂ per liter) for untreated water (UW), the filtrate (FW) and the differential rate between these two measurements (Abt).

The combination of the ozone with the coagulant enables a 78% reduction in the organic matter.

Under the same operating conditions, the presence of ozonized air improves the performance characteristics of the microfiltration: the flows of permeate are increased by 40%.

Figure 9:
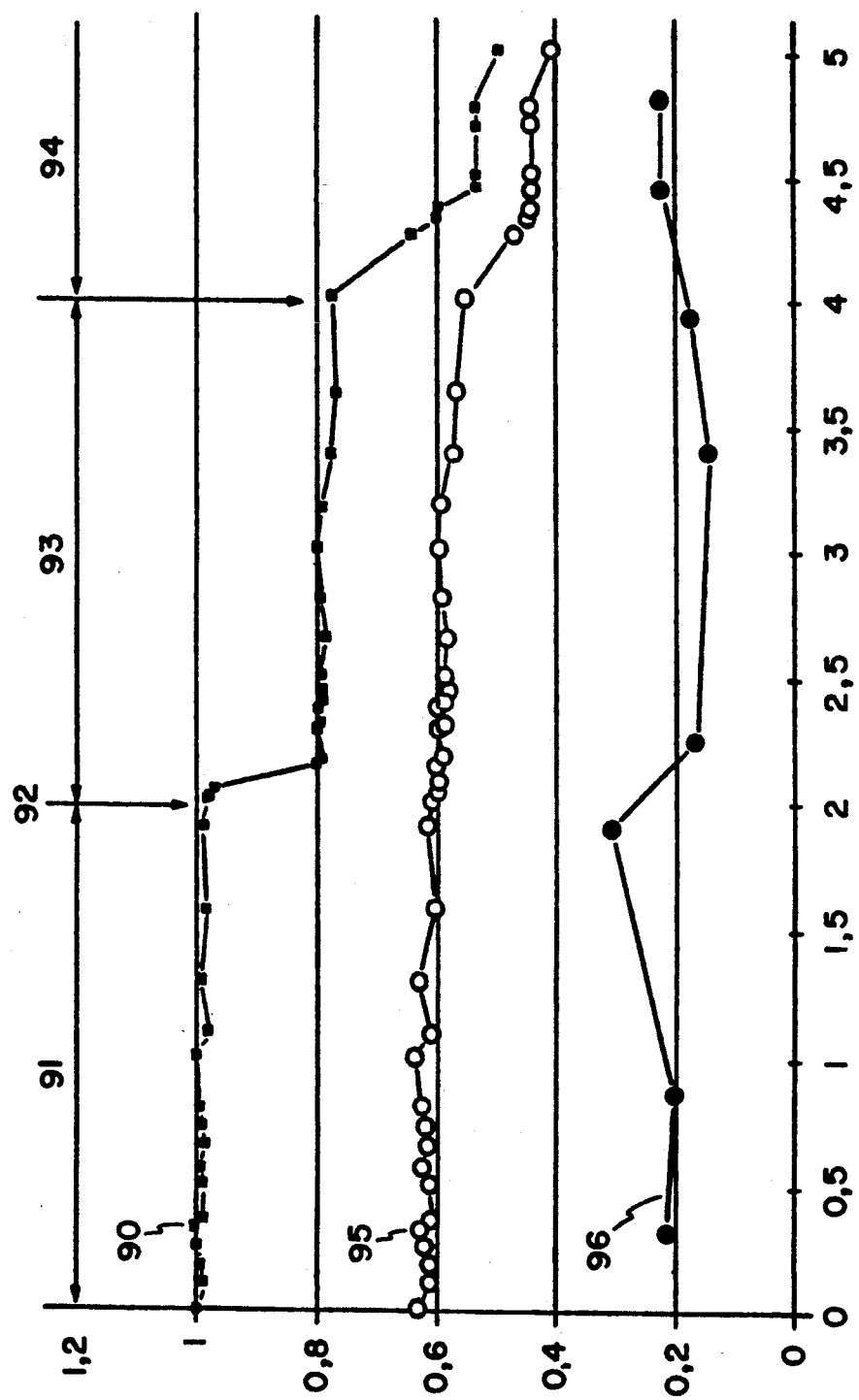
FIG. 9 is a graph illustrating the positive results obtained through the injection of ozone microbubbles into a loop for the treatment of flocculated Seine water according to the method of the invention.

This is seen notably in the graph of test results of FIG. 9 showing the three curves of changes in the following values during another test:

Variation of the flow rate of filtrate 90 successively in the presence of ozonized air microbubbles (91) then, after introduction 92 of active carbon in powder form with ozonized air microbubbles (93), and finally without additives, with only flocculated water circulating in the loop (94);

Corresponding variation of the flow of the filtrate (95);

Corresponding variation of the proportion of organic matter in the filtrate.

The ozone was injected in a proportion of 1 mg/l. The dose of active carbon added at 92 was 5 g.

The test conditions were a speed of circulation of 4 m/s in the loop, an unclogging by reversal of flow of 5s/5 min and a load loss of 0.6 bar in the loop.

It is seen from the curve 90 that the addition of ozonized air makes it possible approximately to double the flow rate of the filtrate, as compared with the circulation of flocculated water alone (flow rate of about 1 $m^3/m.m^2$ instead of 0.5 $m^3/h.m^2$).

Furthermore, on a secondary basis, a reduction in the flow rate of the filtrate is noted during the introduction of powdered active carbon in the presence of the injection of ozonized air in the liquid to be treated, as compared with the case where only ozonized air is injected. This can be explained by the fact that the addition of active carbon increases the proportion of suspended matter in the water to be treated. By contrast, it is noted in the curve 96 that there is an appreciable correlative reduction in the proportion of organic matter in the filtrate, which shows the active carbon/ozone bubble synergy characteristic of one of the preferred modes of implementation of the invention.

The invention is naturally not restricted to these embodiments.

Thus, the method of the invention may also be implemented to keep said tangential membrane filtration loop in a disinfecting environment during periods when said loop is not used for the treatment of liquids. This maintenance operation can be performed continuously as well as periodically.

What is claimed is:

1. An installation for the filtering and cleansing of liquids such as water, comprising;
    an ozone gas source; and
    a filtration loop with recirculating pump and at least one tangential filtration membrane through which part of the liquid to be treated flows, the filtration membrane having pores with a maximum size of 10 microns, the installation including means for the addition of ozone as an oxidizing gas from the ozone gas source to the liquid to be treated in the loop upstream of the membrane, so as to form microbubbles of said gas with a size such that they create turbulence in the liquid at the membrane, and this turbulence, combined with the phenomenon of oxidation, restricts the clogging of said membrane and leads to an improvement in the flow rate and in the physical/chemical qualities of the filtrate.

2. An installation according to claim 1, wherein said means for the addition of an oxidizing gas include means for forming microbubbles having a diameter ranging from 10 μm to 2 mm.

3. An installation according to claim 1, wherein said means for the addition of an oxidizing gas include means for changing the proportion and concentration of said gas added to the liquid to be treated as a function of the quality of the liquid to be treated and/or of the desired proportion of dissolved residual gas.

4. An installation according to claim 1, including means for performing a prior chemical conditioning upstream of said filtration loop to the liquid to be treated.

5. An installation according to claim 1, wherein said filtration loop includes a degassing tube mounted downstream of the membrane and adapted to the protection of the recirculating pump against said microbubbles.

6. An installation according to claim 5, including second means for injecting an oxidizing gas into said filtration loop for carrying out a treatment of water charged with organic matter, or an iron extraction or demanganization treatment.

7. An installation according to claim 6, wherein the second means for injecting an oxidizing gas into the loop is an emulsifying machines mounted upstream of the degassing tube.

8. An installation according to claim 6, wherein the second means for injecting an oxidizing gas into the loop is a porous material placed in the degassing tube.

9. An installation according to claim 8, wherein said degassing tube is formed by an aerated biological filter.

10. An installation according to claim 9, wherein said biological filter includes floating biomass supports, upstream of which there are positioned the injection means of said liquid to be treated.

11. An installation according to claim 6, wherein the second means for injecting an oxidizing gas into the loop is an ozonization-floatation device.

12. An installation according to claim 11, wherein said ozonization is carried out by porous materials, the sweeping of which is achieved by the recirculation conduit.

13. An installation according to claim 11, wherein the oxidizing gas is introduced by means of an emulsifying machine.

14. An installation according to claim 6 wherein the second means for injecting an oxidizing gas into the loop is an ozonization vessel.

15. An installation according to claim 1, including means for injecting chemical reagents and/or adsorbents into the filtration loop.

16. An installation according to claim 15, wherein a static mixer device is mounted downstream of said means for the injection of chemical reagents and/or absorbents.

17. An installation according claim 15, wherein said means for injecting chemical reagent and/or adsorbent are means for injecting active carbon.

18. An installation according to claim 1 wherein said means of injecting microbubbles of said oxidizing gas includes means for injecting clear water in said filtration loop so as to keep said tangential membrane filtration loop in a disinfecting environment during periods when said loop for the treatment of liquids is not used.

19. An installation according to claim 1 including means for controlling the proportion of dissolved residual gas in a renewal liquid which is controlled by said means of injecting microbubbles to renew said tangential filtration membrane during periodic cycles of renewal.

* * * * *